UNITED STATES PATENT OFFICE.

JÜRGEN CALLSEN, OF ELBERFELD, GERMANY, ASSIGNOR TO FARBENFABRIKEN VORM. FRIEDR. BAYER & CO., OF ELBERFELD, GERMANY, A CORPORATION OF GERMANY.

PHARMACEUTICAL COMPOUNDS.

1,094,119. Specification of Letters Patent. Patented Apr. 21, 1914.

No Drawing. Application filed June 17, 1913. Serial No. 774,125.

*To all whom it may concern:*

Be it known that I, JÜRGEN CALLSEN, doctor of philosophy, chemist, citizen of the German Empire, residing at Elberfeld, Germany, have invented new and useful Improvements in Pharmaceutical Compounds, of which the following is a specification.

My invention relates to the production of new pharmaceutical products, which are chemically alkoxymethyl esters of cresotinic acids having the following general formula:

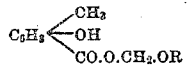

(R meaning an alkyl radical, such as methyl, ethyl, propyl or the like) and which, according to my researches, possess valuable therapeutic properties, being good remedies against rheumatism, an average dose being between 3 and 10 grams for external application.

The process for producing my new compounds consists in treating salts of cresotinic acids with halogenmethyl-alkylethers having the following general formula:

$$X-CH_2-OR$$

(X meaning a halogen atom, R meaning an alkyl radical).

The new products are colorless liquids soluble in ether, alcohol, chloroform and benzene. Their alcoholic solutions are colored violet by ferric chlorid.

In carrying out my new process practically, I can proceed as follows, the parts being by weight:—To 174 parts of the dry sodium salt of meta-cresotinic acid 80.5 parts of monochlorodimethylether having the formula:

$$CH_2Cl-O-CH_3$$

are added little by little, taking care that the temperature does not rise above 50° C. The mixture is stirred for 2 hours. The reaction will be completed after 12 hours. The reaction mass is then treated with a dilute solution of sodium carbonate in order to remove the sodium chlorid and the excess of cresotinic acid. The resulting oil is separated from the salt solution, washed until neutral, dried by means of chlorid of calcium and distilled *in vacuo*. The resulting methoxymethyl cresotinate having the formula:

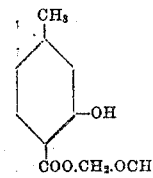

is a clear almost odorless liquid boiling at 125–131° C. under a pressure of about 5 mm. On being heated at the ordinary pressure formic aldehyde is split off. When treated with dilute acids it breaks up into cresotinic acid, formic aldehyde and methylic alcohol.

The process proceeds in an analogous manner if other halogenmethylalkylethers be used. The ethoxymethyl-meta-cresotinic ester boils at 130–135° C. under a pressure of about 10 mm. Other cresotinic acids, such as the para- or ortho-cresotinic acids may be used.

I claim:—

1. The new alkoxymethyl esters of cresotinic acids of the following general formula:

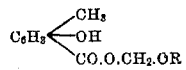

R meaning an alkyl radical, being colorless liquids soluble in ether, alcohol, chloroform and benzene, the alcoholic solutions being colored violet by ferric chlorid and exhibiting valuable therapeutic properties, substantially as described.

2. The new methoxymethyl ester of meta-cresotinic acid of the following formula:

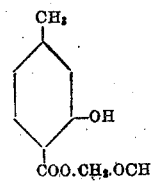

being a clear odorless liquid boiling at

125–131° C. under a pressure of about 5 mm., breaking up into meta-cresotinic acid, formic aldehyde and methylic alcohol when reacted upon by dilute acids and exhibiting valuable therapeutic properties, substantially as described.

In testimony whereof I have hereunto set my hand in the presence of two subscribing witnesses.

JÜRGEN CALLSEN. [L. S.]

Witnesses:
  HELEN NUFER,
  ALBERT NUFER.